C. E. ROSS.
PISTON PACKING.
APPLICATION FILED MAR. 21, 1910.
961,373.
Patented June 14, 1910.
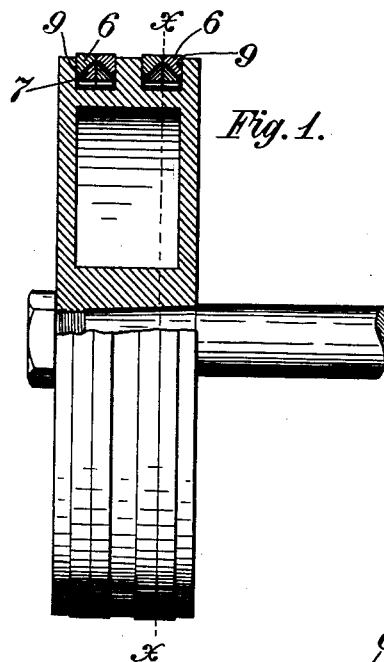
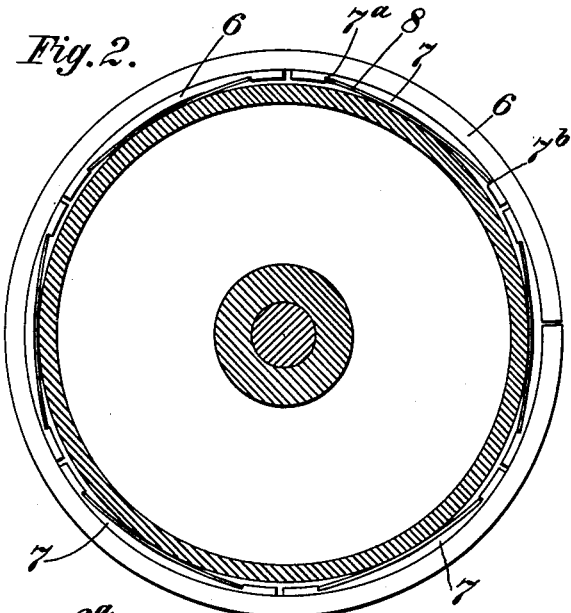
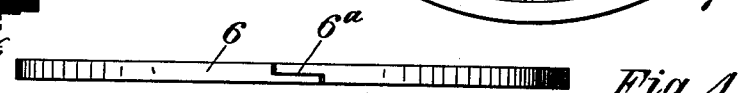
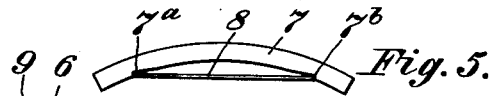
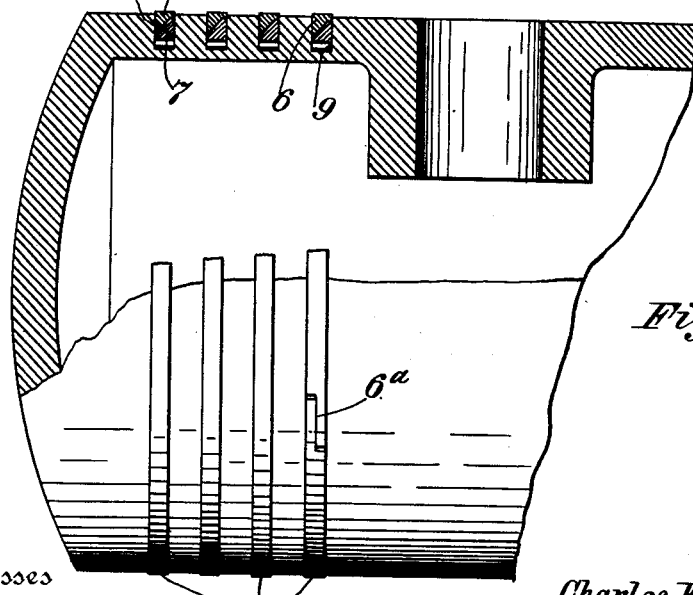

UNITED STATES PATENT OFFICE.

CHARLES E. ROSS, OF COLUMBUS, OHIO.

PISTON-PACKING.

961,373.

Specification of Letters Patent. Patented June 14, 1910.

Application filed March 21, 1910. Serial No. 550,566.

*To all whom it may concern:*

Be it known that I, CHARLES E. ROSS, a citizen of the United States, residing at Columbus, in the county of Franklin and State of Ohio, have invented a certain new and useful Improvement in Piston-Packing, of which the following is a specification.

The object of this invention is to provide a simple, cheap and effective packing for pistons and analogous structures.

This invention consists in the construction of parts and combinations of parts herein shown and described the features of novelty being pointed out in the claims appended to the description.

In the accompanying drawings in which are shown two applications of the invention—Figure 1 illustrates an edge view partly in section and partly in elevation of the piston of a steam engine cylinder equipped with my packing. Fig. 2 is a section on the line $x$—$x$ Fig. 1. Fig. 3 is a view partly in section and partly in elevation of a piston of a gas engine equipped with my invention. Fig. 4 is an edge view at the split side of one of the packing rings removed. Fig. 5 is a side view of one of the spring actuated follower sections.

The packing ring designated 6 is made of a single piece of steel or other suitable spring metal and is generally triangular in the cross section of the bar constituting it. The particular form of the cross section shown is a right angle triangle with one of the acute angles constituting the inner edge of the ring. The ring may be termed a beveled or chamfered ring. The ring is split or divided so that it can be sprung or expanded to permit it to be placed in its seat on the piston.

At 6ª is shown a common form of lap joint at the split portion of the ring which joint may or may not be employed as may be desired.

In Fig. 5 is shown the spring actuated follower for pressing or holding the packing ring proper outward in contact with the interior sides of the cylinder. This follower includes an arc shaped piece 7 of metal that is also generally triangular in cross section matching in size and form the cross section of the packing ring proper, so that when its beveled or hypotenuse side is placed against the hypotenuse side of the ring a figure substantially rectangular in cross section is produced. The inner face of the follower piece 7 is provided with two notches 7ª and 7ᵇ, one near each end of the piece into which is sprung, or slid side-wise, a piece of stiff spring steel 8 or other suitable spring metal. The form and depth of the notches is such that the spring 8 can be sprung or curved somewhat toward the inner side of the piece 7 without seriously displacing the spring, especially when the follower is confined in a groove.

The piston represented in Fig. 3 is such as is commonly employed in explosion engines. This piston is shown as provided with four circumferential grooves 9. In practice a groove of this kind is first provided with a series of the followers preferably in close succession and entirely encircling the groove and with their beveled sides coinciding. The ring 7 is then sprung into place on the followers with its beveled side fitting against the beveled sides of the followers. In Fig. 1, which shows a steam piston, the circumferential groove 9 is made of twice the width of the groove shown in Fig. 3, and two of the rings 7 with their beveled sides facing toward the middle line of the groove to form a V-shaped channel and two sets of the followers to form a coöperating wedging ring are shown as employed.

The number of grooves and packings in a cylinder is, of course, a matter of choice controlled by the necessity for tightness, but with my construction greater efficiency is obtained with fewer and narrower and thinner rings than are ordinarily used. The mode of securing the springs 8 is exceedingly simple and cheap, their manipulation easy and their operation effective in holding the packing rings to their proper position. It will also be observed that with this construction the followers and rings can be combined to form wide or narrow packings and further that parts are easily replaced when damaged or worn.

What I claim is:

1. In combination with a piston or analogous structure having a circumferential groove, a plurality of followers seated in said groove, each consisting of an arc-shaped piece having notches in and near its end portions and a flat-metal spring subtending said arc-shaped piece and seated in said notches and adapted to be retained by said notches in connection with said sections, and a packing ring superimposed on said arc-shaped pieces.

2. In combination with a piston, or analogous structure having a circumferential groove, a plurality of followers seated in said groove each consisting of an arc-shaped piece beveled at one side and having notches near its end portions and a flat-metal spring subtending said arc-shaped piece and adapted to be retained by its own resilience in said notches in connection with said section and a packing ring having beveled sides superimposed on the beveled sides of the follower pieces.

3. In combination with a piston or analogous structure having a circumferential groove, a plurality of followers seated in said groove each consisting of an arc-shaped piece beveled on its outer side and having notches near its ends on its inner side with a flat-metal spring seated in said notches and adapted by its own resilience to be retained therein and a plurality of packing rings in said grooves superimposed in the beveled sides of said followers.

CHARLES E. ROSS.

Witnesses:
ALLEN W. THURMAN,
BENJAMIN FINCKEL.